Dec. 2, 1930. A. A. OVERBURY 1,783,446

ATTACHMENT FOR CALCULATING MACHINES

Filed April 9, 1929

Austin A. Overbury INVENTOR.

BY H. A. Sparks his ATTORNEY.

Patented Dec. 2, 1930

1,783,446

UNITED STATES PATENT OFFICE

AUSTIN A. OVERBURY, OF WEST ORANGE, NEW JERSEY, ASSIGNOR TO MONROE CALCULATING MACHINE COMPANY, OF ORANGE, NEW JERSEY, A CORPORATION OF DELAWARE

ATTACHMENT FOR CALCULATING MACHINES

Application filed April 9, 1929. Serial No. 353,725.

This invention relates to an attachment for calculating machines and particularly to the bearings for the shafts thereof, the principal object being to provide a detachable bearing for calculating machine frames so that the frame may be stamped and the bearing accurately located in the frame.

Another object of the invention is to produce a novel form of bearing so that the same may be die-cast.

Another object of the invention is to provide a stamped frame and a cast bearing with means for accurately assembling the same but leaving the bearing readily detachable.

Another object of the invention is to provide a bearing of this nature with suitable means for adjusting the play in the shaft supported thereby.

Other objects will appear from the following description and be particularly pointed out in the appended claims. I attain all of these objects by means illustrated in the accompanying drawings in which:

Like characters of reference refer to like parts in all views.

Figure 1:
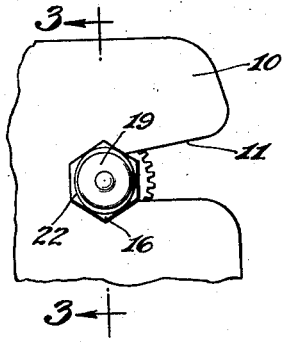
Fig. 1 is a fragmentary side elevation of a calculating machine frame with my improved bearing in place.
Figure 2:
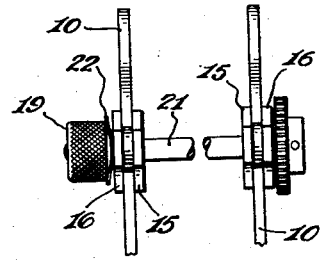
Fig. 2 is a rear end elevation of a pair of calculating machine frames carrying a shaft mounted in my improved bearings.
Figure 3:
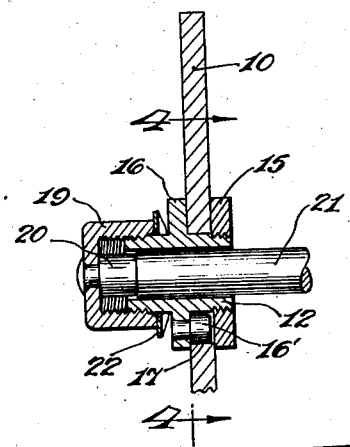
Fig. 3 is a vertical sectional view taken substantially on line 3—3 of Fig. 1.
Figure 4:
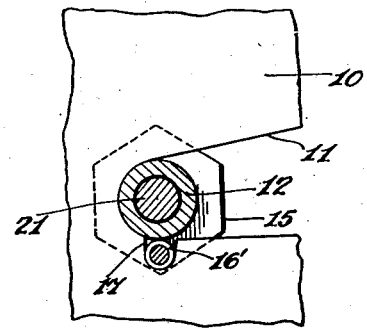
Fig. 4 is a sectional view taken substantially on line 4—4 of Fig. 3.
Figure 5:
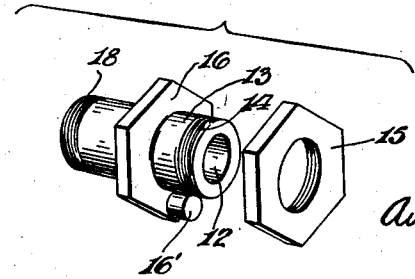
Fig. 5 is a detached perspective view of the elements of my improved bearing.

This invention contemplates the providing of a bearing with a flange having thereon a pin adapted to be seated in a notch formed in the edge of a slot in a calculating machine frame, so as to lock the bearing in its proper relation to the frame when a nut is screwed on to one end of the bearing. It further contemplates the providing where desired of the bearing with a cap at its external side which cap may be adjusted so as to bring an element thereof into engagement with the end of the shaft so as to limit the end play on lateral adjustment of the same.

Referring to the drawing in detail, 10 represents a calculating machine frame which is made of a stamping and is provided with a slot at 11, the inner end of the slot being formed arcuate to accommodate a sleeve 12 which forms a bearing for a shaft 21. The sleeve 12 is extended inwardly at 13 and provided with threads 14 adapted to coact with a nut 15 to lock the bearing in place in frame 10.

The sleeve 12 is provided with a nut-like flange 16 adapted to press against the outer side of the frame 10. This flange 16 carries a laterally extended pin 16' which is adapted to enter a notch 17 in the slot 11 and lock the bearing against turning or displacement with relation to the frame 10.

The sleeve 12 may be extended outside the frame and provided with screw-threads as at 18 for receiving a nut 19 carrying a centrally located inwardly extended pin 20. By screwing up on nut 19, the pin 20 may be protruded into the bearing 12 against the end of the shaft 21 so as to take up any undesirable play in the shaft. A spring washer 22 holds the nut 19 in adjusted position. Where it is desired to have a simple bearing, the same may be formed without the outer sleeve portion, simply locking into the frame, the end-play of the shaft being limited by any well known means.

By sliding the bearing into slot 11 until pin 16' strikes the arcuate inner end of slot 11 and then rotating the bearing pin 16' will enter notch 17 and center itself and the bearing by merely pressing the latter in. Also by then tightening nut 13, the pin 16' becomes a fulcrum for forcing the bearing into the arcuate seat at the end of slot 11.

While I have described what I consider to be the most desirable embodiment of my invention, it is obvious that many changes could be made without departing from the spirit of my invention, and I, therefore, do not limit myself to the exact construction shown nor to anything less than the whole of my invention as hereinbefore described, and as hereinafter claimed.

I claim:

1. The combination of a frame formed with a main slot and a secondary slot leading into said main slot, a bearing adapted to be seated in the first said slot and carrying a locking element adapted to engage the second said slot and to coact therewith for forcing said bearing to its seat in the first said slot, and means for securing said bearing to said frame.

2. The combination of a frame formed with a main slot and a secondary slot leading into said main slot, a bearing adapted to be seated in the first said slot and formed with a flange adapted to engage said frame, said flange carrying a pin adapted to engage said secondary slot to retain the bearing against rotation in said frame, and means cooperative with said bearings for securing the latter against longitudinal displacement in said frame.

3. The combination with a frame member having a bearing-supporting aperture and a locating aperture, of a bearing formed with a sleeve-like portion adapted to enter the first said aperture, a flange carrying a retaining element adapted to enter the second said aperture and a sleeve-like portion extending outwardly from said frame; a shaft mounted in said bearing; and a cap adapted to cooperate with the last said sleeve-like portion of said bearing and including a central pin adapted to abut the end of said shaft.

4. The combination of a frame formed with a slot having an arcuate bearing seat and with a notch opening into said slot at said arcuate seat, and a bearing formed with a cylindrical portion and a lug adapted to seat itself in said notch upon moving said bearing into said slot whereby said bearing is held against rotation.

5. The combination of a frame formed with a main slot and a secondary slot leading into said main slot, of a bearing formed with a lug adapted to enter said secondary slot upon moving said bearing at right angles to its axis into said main slot and to form a fulcrum for effecting seating of said bearing and a lock for preventing further rotation of said bearing after it is seated.

In testimony whereof I affix my signature.

AUSTIN A. OVERBURY.